US007353143B1

(12) United States Patent
Moulios

(10) Patent No.: US 7,353,143 B1
(45) Date of Patent: Apr. 1, 2008

(54) REVIEWING AND CHANGING THE OUTCOME OF A DIGITAL SIGNAL PROCESSING OPERATION

(75) Inventor: Christopher Moulios, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/207,284

(22) Filed: Aug. 19, 2005

(51) Int. Cl.
*G06F 15/00* (2006.01)

(52) U.S. Cl. ....................................... 702/189; 702/190

(58) Field of Classification Search ................ 702/189, 702/190
See application file for complete search history.

(56) References Cited

U.S. PATENT DOCUMENTS 6,681,191 B1 * 1/2004 Pickerd et al. ................ 702/76
7,050,070 B2 * 5/2006 Ida et al. .................... 345/629

OTHER PUBLICATIONS

Losada, R; "Practical Fir Filter Design in Matlab"; The Math Works, Inc.; Mar. 31, 2003.*
www.mathworks.com/products/matlab.*

* cited by examiner

*Primary Examiner*—John E. Barlow, Jr.
*Assistant Examiner*—Douglas N Washburn
(74) *Attorney, Agent, or Firm*—Hickman Palermo Truong & Becker LLP

(57) ABSTRACT

An input signal is analyzed and a proposed processing control is output for review. A user may interact with the proposed processing control to change the outcome of the digital signal processing operation. As proposed changes are received, feedback is output so a user may see the results of the proposed operation. Input from a user commits the changes and the new waveform is output.

19 Claims, 4 Drawing Sheets

REVIEWING AND CHANGING THE OUTCOME OF A DIGITAL SIGNAL PROCESSING OPERATION

FIELD OF THE INVENTION

The present invention relates to digital signal processing, and more specifically, reviewing and changing the outcome of digital signal processing operations.

BACKGROUND

By definition, signal processing operations change one signal into another signal. Some examples of signal processing operations are: changing the amplitude of a signal; changing the frequency content of a signal; and inverting a signal.

Before the advent of computers, signal processing operations were accomplished with circuits or spring-mounted transducers. By manipulating analog controls in real-time, properties of a signal could be altered.

In computer processing of digital signals, routines are executed to perform the signal processing operations. Frequently, such routines are designed to process the data that represents the signal (the "signal data") in a monolithic operation that combines analysis and processing in one step. Specifically, when executed, the signal processing routines both (1) determine how the signal data should be changed (analysis), and (2) change the signal data accordingly (processing). Once the user has initiated the signal processing operation, the user simply awaits completion of the operation, hoping that the parameters that have been specified for the operation produce a beneficial result.

Combining analysis and processing in this manner has drawbacks. For example, when analysis and processing are combined, the user only finds out how an operation will specifically change a signal by listening to the final result. If the user does not like how the operation changed the signal, then the user has to undo the change, modify the values of the parameters that govern the operation, and try again. Consequently, the user must often revert to repetitive experimentation using trial and error to produce the desired result.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques shall be described hereafter for performing three-phase signal processing operations. During the first phase, analysis is performed but no changes are actually made to the signal data. During the second phase, the results of the analysis are presented to a user, and may be modified according to the user's needs. During the third phase, the signal data is modified by performing the signal processing operation in a manner that reflects the modifications specified during the second phase.

According to one embodiment, an input signal is analyzed to determine how a particular signal processing operation would change the signal and, before any changes are actually made to the signal data, a "proposed processing control" is output for review. The proposed processing control displays a "proposed outcome" of the operation to indicate how the particular signal processing operation would change the signal. A user may interact with the proposed processing control to change the proposed outcome, thereby changing how the particular signal processing operation would change the signal. As changes to the proposed outcome are received, feedback is output so that the user may see the modified proposed outcome. When the user is satisfied the with the modified proposed outcome reflected in the proposed processing control, the user may initiate the third phase, causing the signal data to be changed and the new waveform to be output.

Dynamic Processing of a Digital Signal

Figure 1:
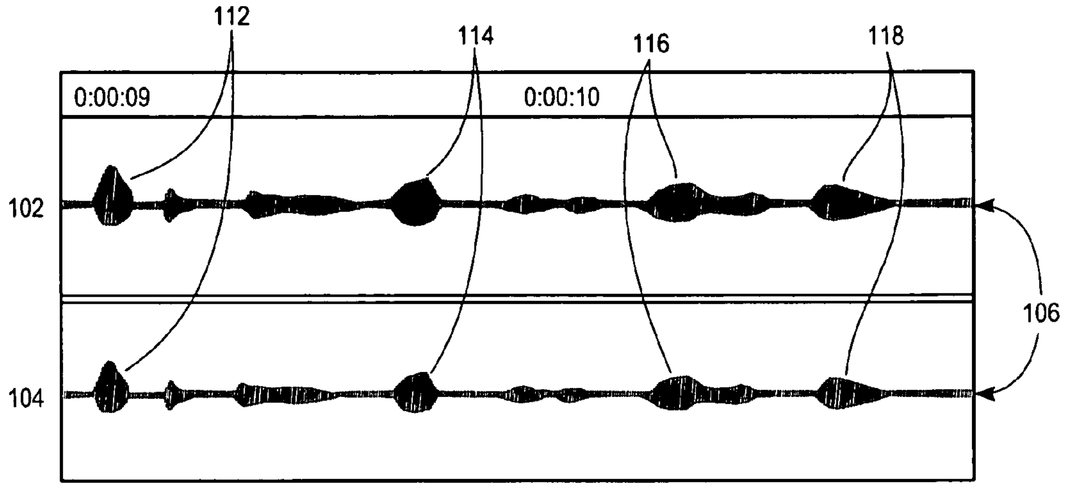
FIG. 1 is a block diagram illustrating the plotting of an input signal's waveform.

Referring to FIG. 1, it is a block diagram illustrating the plotting of an input signal's waveform. In this example, the plot indicates the amplitude, over time, for sound data. Time is represented by the horizontal axis, and the signal's amplitude is plotted on the vertical axis. In this example, there is a left signal plot 102 and a right signal plot 104. The portion of the plot above the baselines 106 indicates a positive signal and the portion of the plot below the baselines 106 indicates a negative signal. The vertical distance of the plot from the baselines 106 represents the amount of increase or decrease in the signal.

Other properties of a signal may be displayed in this manner, such as frequency. Through this graphical display, it is possible to visually ascertain various properties of an input signal, such as when sounds are loud and soft. FIG. 1 illustrates a signal with uneven volume levels, where portions of the signal are louder 112, 114, 116, 118 than other portions.

Figure 2:
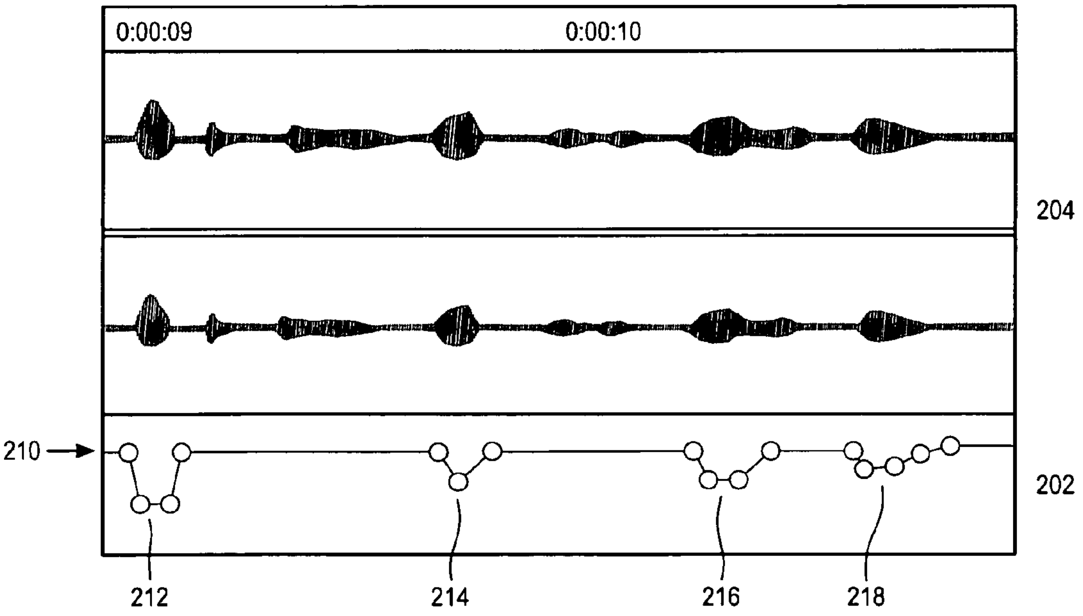
FIG. 2 is a block diagram illustrating the output of a proposed processing control according to an embodiment of the invention.

Referring to FIG. 2, it is a block diagram illustrating the output of a proposed processing control 202, according to an embodiment. The proposed processing control 202 reflects a proposed editing of the outcome of a signal processing operation. According to one embodiment, the proposed processing control 202 includes sets of envelope points 212, 214, 216, 218 that operate similarly to Bezier control points. By manipulating the envelope points 212, 214, 216, 218, the proposed outcome of the digital signal processing operation may be altered and controlled. Instead of the digital signal processing being an automatic process, this intermediate step allows a user to interact with and control the processing of the digital signal. The preferred embodiment allows a user to visually interpret the proposed processing and interact with the processing. Unlike stream-based processing, a user of proposed processing control 202 does not have to make split second decisions for on-the-fly changes during the transformation of a signal stream.

By manipulating the proposed processing control 202, the user can change the processing that is going to be performed on any part of the signal, because the signal is not actually changed until the user initiates the third phase of the signal processing operation. Thus, a user may specify a change to a later portion of the signal, and then specify a change to an earlier portion of the signal.

In FIG. 2, the visualization of the signal's waveform 204 graphically represents an input signal's amplitude over time. The signal is analyzed and the proposed processing control 202 is created. The proposed processing control 202 externalizes properties of the proposed processing, such as an audio gain curve, into an envelope point control display. The proposed processing control 202 describes changes to occur to the signal after processing. The envelope points 212, 214, 216, 218 lower than the baseline 210 indicate a proposed decrease in signal level. In this example, four areas are considered too loud and require gain attenuation. The envelope points 212, 214, 216, 218 describe the proposed changes to occur during processing and may be altered by a user. In one embodiment, input from a mouse is received to edit the envelope points 212, 214, 216, 218, although any form of user input may be used. The input of manipulating the envelope points 212, 214, 216, 218 changes the outcome that will be produced upon executing the proposed digital signal processing algorithm. In one embodiment, notification is given to the user in case of an error in modifying the envelope points 212, 214, 216, 218, such as exceeding the boundary of the proposed processing control 202.

While the illustrated embodiment relates to an audio signal, other embodiments are envisioned where proposed processing of any digital signal may be output for user interaction. Any internal signal parameter may be output utilizing the envelope point control display.

Figure 3:
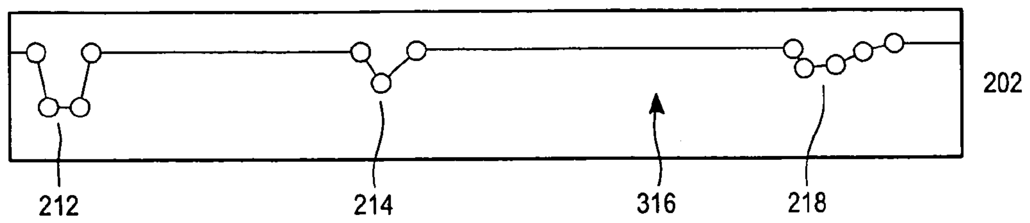
FIG. 3 is a block diagram illustrating the dynamic processing of a digital signal according to an embodiment of the invention.

Referring to FIG. 3, it is a block diagram illustrating an embodiment of the invention wherein a user has modified certain envelope points 212, 214, 216, 218. In FIG. 3, the user has modified the proposed processing control 206 by flattening an area 316 of the proposed processing control 202 that previously indicated a proposed decrease in signal level (FIG. 2, 216). The remaining areas of the signal associated with specific envelope points 212, 214, and 218 will undergo processing in accordance with the proposed processing control 202. After specifying modifications through the manipulation of the specific envelope points 212, 214, 216, 218, the user may initiate the third phase of the signal processing operation, in which the signal is actually changed.

Figure 4:
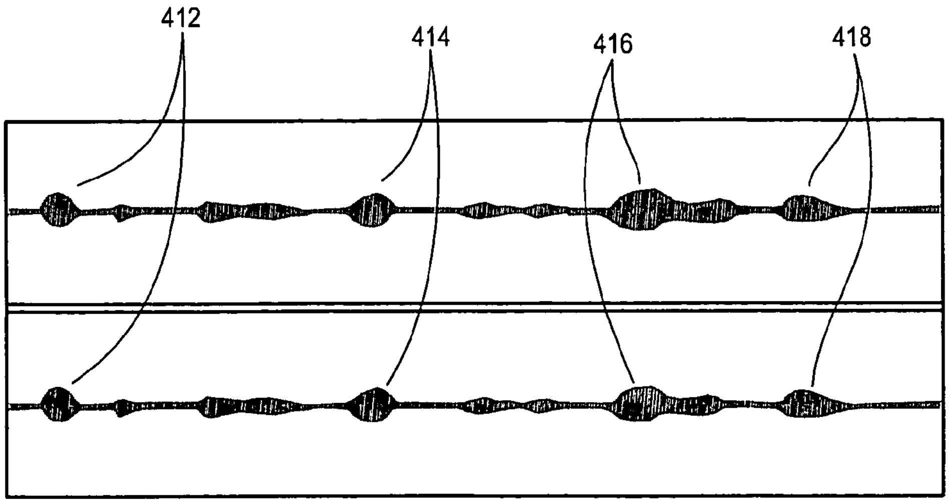
FIG. 4 is a block diagram illustrating the result of the digital signal processing operation based on the user input of FIG. 3 according to an embodiment of the invention.

Referring to FIG. 4, it is a block diagram illustrating the result of the digital signal processing operation based on the user input of FIG. 3, according to an embodiment. The waveform has been altered to reduce the amplitude of the input signal according to the proposed processing control 202, specifically the areas of the signal associated with envelope points 212, 214, and 218. It is illustrative to note that the portion of the signal 416 corresponding with the edited envelope points is unchanged from the original signal 116, while the remaining portions 412, 414, 418 have been changed to reduce the dynamic range of the signal. In one embodiment, only one parameter, such as amplitude, is presented. However, multiple parameters and properties of an input signal could be processed, according to other embodiments of the invention.

Figure 5:
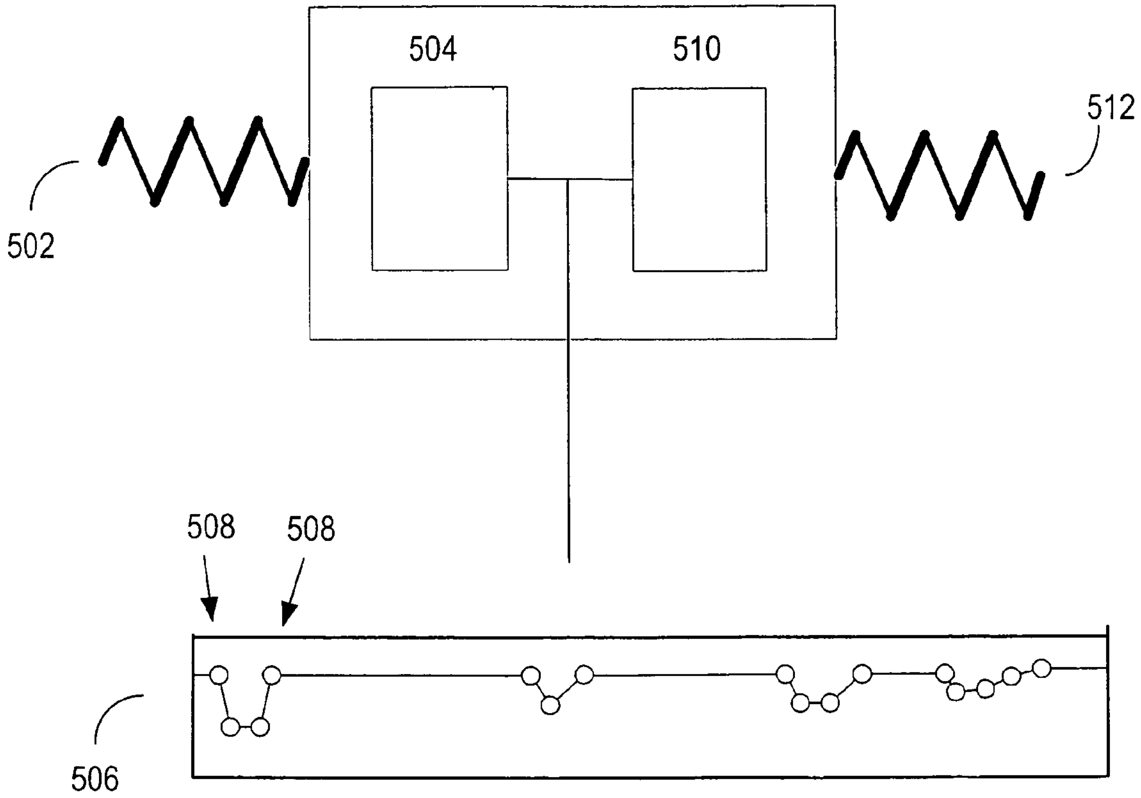
FIG. 5 is a block diagram illustrating the dynamic processing of digital signal data according to an embodiment of the invention.

Referring to FIG. 5, it is a block diagram illustrating the dynamic processing of digital signal data according to an embodiment. The input signal 502 is received as input into the signal processing routine. The input signal is analyzed 504 and output in the form of the proposed processing control 506 which, in one embodiment, utilizes envelope points 508 to allow a user to edit the proposed processing. Other embodiments are envisioned with alternate forms of user control.

After the proposed processing is finalized, the digital signal 502 is processed 510 according to the output of the proposed processing control 506. The resultant digital signal is then output 512.

Hardware Overview

Figure 6:
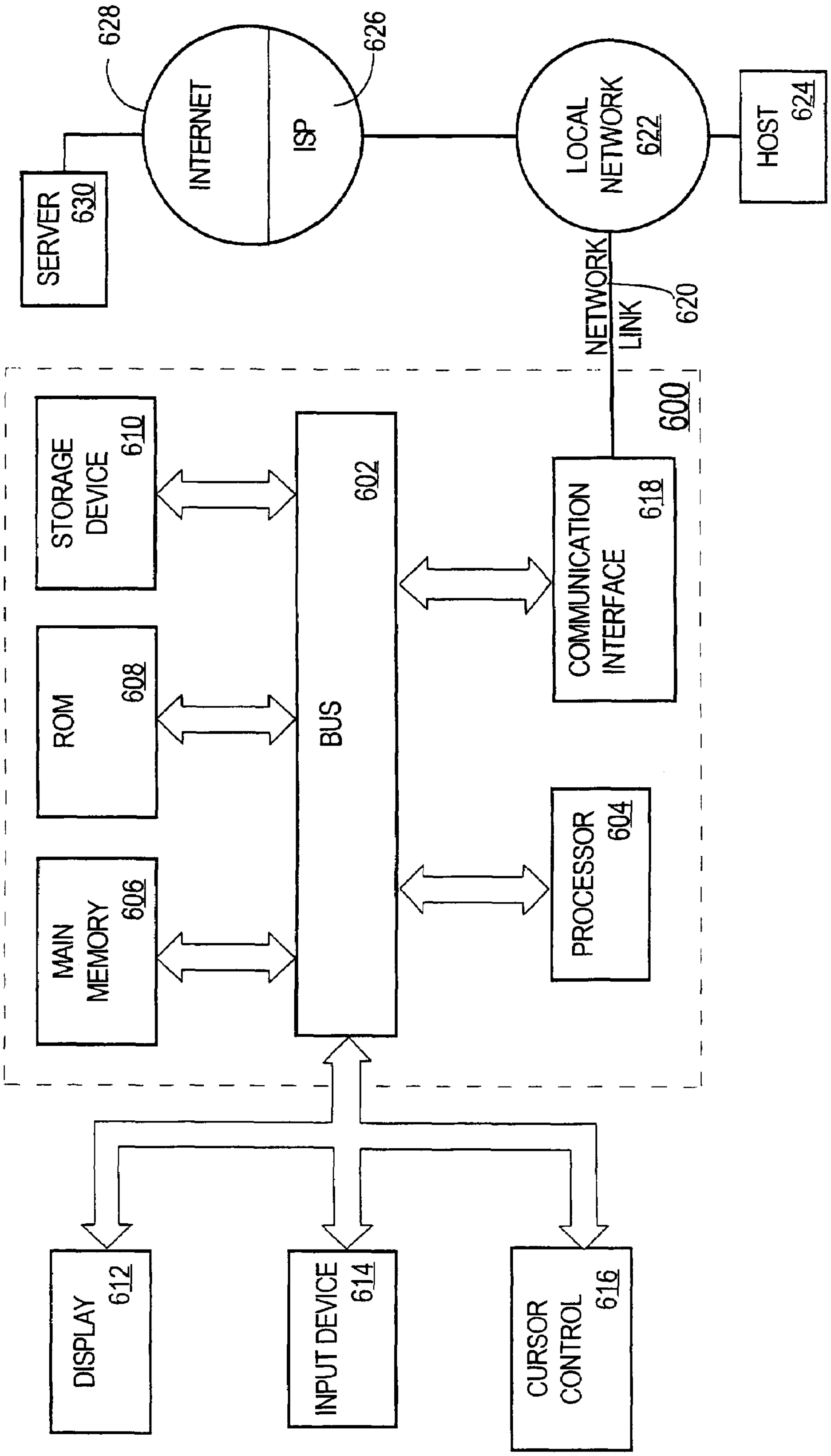
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for digital signal processing, the method comprising:

executing a process that (a) analyzes an input signal and (b) makes a determination about how to modify the input signal during a digital signal processing operation;

displaying a visualization of the input signal;

after the process analyzes the input signal, and before modifying the input signal, outputting a proposed processing control, wherein the proposed processing control reflects an outcome that would be produced by modifying the input signal based on said determination made by the process;

receiving user preferences that specify changes to how the input signal should be modified during the digital signal processing operation; and modifying the digital input signal based on the determination, as modified by said user preferences.

2. The method of claim 1, wherein the proposed processing control comprises envelope points.

3. The method of claim 2, wherein the envelope points are editable by a user.

4. The method of claim 1, wherein the user preferences are received through the proposed processing control.

5. The method of claim 1, wherein the visualization reflects multiple parameters of the signal.

6. The method of claim 2, wherein the user preferences comprise a user manipulating the envelope points.

7. The method of claim 1, further comprising feedback to the user in the case of an error.

8. The method of claim 1, wherein the modifying step comprises changes to the amplitude of a signal.

9. A computer-readable storage medium carrying one or more sequences of instructions which, when executed by one or more processors, causes the one or more processors to perform the method recited in claim 2.

10. A computer-readable storage medium carrying one or more sequences of instructions which, when executed by one or more processors, causes the one or more processors to perform the method recited in claim 3.

11. A computer-readable storage medium carrying one or more sequences of instructions which, when executed by one or more processors, causes the one or more processors to perform the method recited in claim 4.

12. A computer-readable storage medium carrying one or more sequences of instructions which, when executed by one or more processors, causes the one or more processors to perform the method recited in claim 5.

13. A computer-readable storage medium carrying one or more sequences of instructions which, when executed by one or more processors, causes the one or more processors to perform the method recited in claim 6.

14. A computer-readable storage medium carrying one or more sequences of instructions which, when executed by one or more processors, causes the one or more processors to perform the method recited in claim 7.

15. A computer-readable storage medium carrying one or more sequences of instructions which, when executed by one or more processors, causes the one or more processors to perform the method recited in claim 8.

16. A computer-readable storage medium carrying one or more sequences of instructions which, when executed by one or more processors, causes the one or more processors to perform the steps of:

executing a process that (a) analyzes an input signal and (b) makes a determination about how to modify the input signal during a digital signal processing operation;

displaying a visualization of the input signal;

after the process analyzes the input signal, and before modifying the input signal, outputting a proposed processing control, wherein the proposed processing control reflects an outcome that would be produced by modifying the input signal based on said determination made by the process;

receiving user preferences that specify changes to how the input signal should be modified during the digital signal processing operation; and modifying the digital signal based on the determination, as modified by said user preferences.

17. A method for visualizing digital signal data, the method comprising:

executing a process that (a) analyzes an input signal and (b) makes a determination about how to modify the input signal during a digital signal processing operation;

displaying a visualization of the signal representing properties of the signal;

after the process analyzes the input signal, outputting a proposed processing control comprised of user-editable interface means, wherein the control operates to illustrate the outcome of a digital signal processing operation on the signal and receive input comprising changes in the digital signal processing operation;

receiving user preferences comprising changes in the control; and using the user preferences to process the digital signal.

18. A computer-readable storage medium carrying one or more sequences of instructions which, when executed by one or more processors, causes the one or more processors to perform the steps of:

executing a process that (a) analyzes an input signal and (b) makes a determination about how to modify the input signal during a digital signal processing operation;

displaying a visualization of the signal representing properties of the signal;

after the process analyzes the input signal, outputting a proposed processing control comprised of user-editable interface means, wherein the control operates to illustrate the outcome of a digital signal processing operation on the signal and receive input comprising changes in the digital signal processing operation;

receiving user preferences comprising changes in the control; and modifying the digital signal based on the user preferences.

19. A method for digital signal processing, the method comprising:

executing a process that (a) analyzes an input signal and (b) makes a determination about how to modify the input signal during a digital signal processing operation;

displaying a graphical representation of the input signal;

after the process analyzes the input signal, and before modifying the input signal, outputting a proposed processing control, wherein the proposed processing control reflects an outcome that would be produced by modifying the input signal based on said determination made by the process;

receiving user preferences that specify changes to how the input signal should be modified during the digital signal processing operation; and modifying the digital input signal based on the determination, as modified by said user preferences.

* * * * *